United States Patent [19]

Benzing

[11] Patent Number: 5,121,363
[45] Date of Patent: Jun. 9, 1992

[54] FRACTURE DETECTION LOGGING TOOL
[75] Inventor: William M. Benzing, Katy, Tex.
[73] Assignee: Conoco Inc., Ponca City, Okla.
[21] Appl. No.: 634,251
[22] Filed: Dec. 26, 1990
[51] Int. Cl.$^5$ .............................................. G01V 1/40
[52] U.S. Cl. ...................................... 367/35; 367/69; 181/105; 73/151
[58] Field of Search ...................... 367/25, 35, 69, 912; 181/105, 106; 364/422, 223.9; 166/250, 254; 73/151, 633

[56] References Cited

U.S. PATENT DOCUMENTS

| 2,244,484 | 6/1941 | Beers . | |
|---|---|---|---|
| 3,344,881 | 10/1967 | White . | |
| 3,668,619 | 6/1972 | Dennis . | |
| 3,916,372 | 10/1975 | Elliott | 367/25 |
| 4,020,451 | 4/1977 | Elliott . | |
| 4,030,064 | 6/1977 | Elliott | 367/35 |
| 4,542,487 | 9/1985 | Benzing et al. | 367/31 |
| 4,542,488 | 9/1985 | Clishem et al. . | |
| 4,709,362 | 11/1987 | Cole | 367/189 |
| 4,802,144 | 1/1989 | Holzhausen et al. . | |
| 4,803,874 | 2/1989 | Marrast et al. | 73/155 |
| 4,870,627 | 9/1989 | Hsu et al. . | |
| 4,874,061 | 10/1989 | Cole . | |
| 4,885,723 | 12/1989 | Havira et al. . | |

FOREIGN PATENT DOCUMENTS 256625  2/1988  European Pat. Off. .

OTHER PUBLICATIONS

Spencer et al; "Thin Layer Fracture Density"; 60th Annu. SEG Int. Mtg., Sep. 27, 1990, v2, pp. 1386-1387; abst only provided.

Lacy et al; "Fracture Azimuth and Geometry Determination"; SPE, vol. 12, pp. 341-356, 1989; abst only.

Primary Examiner—Nelson Moskowitz

[57] ABSTRACT

A method and apparatus by which fractured rock formations are identified and their orientation may be determined includes two orthogonal motion sensors which are used in conjunction with a downhole orbital vibrator. The downhole vibrator includes a device for orienting the sensors. The output of the sensors is displayed as a lissajou figure. The shape of the figure changes when a subsurface fracture is encountered in the borehole. The apparatus and method identifies fractures rock formations and enables the azimuthal orientation of the fractures to be determined.

10 Claims, 3 Drawing Sheets

LISSAJOU FIGURE FOR ORTHOGONAL SENSORS IN A FRACTURED FORMATION

NO FRACTURING

INCIPIENT FRACTURING

INTENSE FRACTURING

ORBITAL MOTION

LISSAJOU FIGURE FOR
ORTHOGONAL SENSORS
IN A NON-FRACTURED
FORMATION

LISSAJOU FIGURE FOR
ORTHOGONAL SENSORS
IN A FRACTURED
FORMATION

FRACTURE DETECTION LOGGING TOOL

BACKGROUND OF THE INVENTION

1. Field of the Invention

The present invention relates methods and apparatus used to identify subsurface formation fractures and their orientation and more particularly to logging tools used in a wellbore to locate fractures to permit proper perforation of well casing maximizing fluid flow from hydrocarbon reservoirs.

2. Related Prior Art

Identification of subsurface fractures has been a goal in oil well production for several decades. Subsurface fractures can cause many problems in addition to providing a path for hydrocarbons to migrate to the wellbore. One such system is a borehole televiewer tool which uses high frequency acoustics to try and image a fracture which intersects the borehole. In addition, many methods and systems have been developed which detect fractures indirectly or by representative signals.

U.S. Pat. No. 4,452,488, "Method and System for Producing a PPI Display" (Clishem et al.) relates to a system where a borehole logging tool employs an energy transmitter and receiver for scanning a borehole with energy pulses. An orientation pulse is produced each time the tool rotates past a predetermined orientation position. The time period between orientation pulses is measured and divided into a plurality of discrete intervals. Sine and cosine functions are generated for the measured time period having a sine and cosine value corresponding to each of the discrete intervals. The sine and cosine functions are used to produce sweep functions for controlling the outward sweep of the electron beam of a PPI display device so as to produce a circular rotating pattern in which each revolution corresponds in time to a measured time between orientation pulses. The output of the receiver modulates the electron beam sweep to generate a visual display of the azimuthal scan of the borehole.

U.S. Pat. No. 3,668,619, (Dennis) describes a rotating logging tool having a single acoustic transducer that operates on reflected energy to detect fractures. U.S. Pat. No. 4,542,488, (Clishem et al.) provides a method and apparatus for controlling the outward sweep of a electron beam of a CRT in the Dennis patent by providing a reference circle. These two patents are closely related as dealing with a borehole televiewer and are relevant as showing a method and apparatus for determining fractures. However, a single transducer is used and, as a result, cannot teach or suggest the present invention.

U.S. Pat. No. 4,874,061, "Downhole Orbital Seismic Source" (Cole), relates to an apparatus for simultaneously generating elliptically polarized seismic shear waves and compression waves downhole for coupling energy through the fluid into the borehole wall. The apparatus includes an elongate frame for support in the borehole and the frame includes a drive means energizable to impart an orbital motion to at least a portion of the frame thereby to generate an orbital shear wave.

U.S. Pat. No. 4,802,144, "Hydraulic Fracture Analysis Method" (Holzhausen et al.) relates to a method which uses a principle that the growth of a hydraulic fracture increases the period of free oscillations in the well connected to the fracture. Simultaneously, the decay rate of free oscillations decreases. The properties of forces oscillations in a well also change during fracture growth. All of these effects result from the changing impedance of the hydraulic fracture that intersects the well. Hydraulic fracture impedance can be defined in terms of the hydraulic resistance and the hydraulic capacitance of a fracture. Fracture impedance can be determined directly by measuring the ratio of down hole pressure and flow oscillation or indirectly from well head impedance measurements using impedance transfer functions. Well head pressure measurements can also be used to evaluate fracture impedance by comparing them to pressure oscillations computed with hydraulic models that include fractures with different impedances. Becaus impedance is a function of fracture dimensions and the elasticity of the surrounding rock, impedance analysis can be used to evaluate the geometry of the fracture by analyzing the data which results from free and forced oscillations in the well, and looking for a match between the data and theoretical models of projected shapes of the fracture.

U.S. Pat. No. 2,244,484, "Method of and Means for Analyzing and Determining the Geologic Strata Below the Surface of the Earth" relates to a method for seismically determining physical characteristics of subsurface formations which includes, generating a sound in the vicinity of a formation and transmitting the same into the formation by means of an electrical acoustic generator, the electrical quantities of which, measured at its terminals, depend upon the extent to which the power delivered to the generator is absorbed by the surrounding or adjacent formations, whereby variations in the measured electrical quantities indicate changes in the physical and lithologic characteristics of the various formations; said measurements being recorded by a graphical plot or log, or other means, at each successive position in the geologic section as a basis of correlation. This patent provides a method of seismically determining changes in physical characteristics of geologic strata which includes, setting up sound waves in the immediate vicinity of the formation or stratum, measuring the velocity of propagation of the sound through the formation and indicating the same at the surface, whereby characteristics of the formation may be readily determined by the time required for the waves to travel through the formation.

U.S. Pat. No. 3,344,881, "Seismic Detection Method" (White), relates to a detector for detecting particle motion waves, such as seismic waves, in the presence of undesirable noise. Three components of particle motion are detected by three coordinate transducers, respectively, and the voltage outputs from the transducers are combined in a manner which suppresses noise waves arriving randomly from all directions and to indicate the direction of arrival of any particular wave train, such as might be caused by an earthquake, explosion, or moving vehicle. Each of the horizontal components of motion is electronically multiplied by the vertical component, with or without phase shift, and the two resulting products are displayed as a vector pointing to the source of the seismic waves.

U.S. Pat. No. 4,802,144, (Holzhausen et al.) uses the measurement of hydraulic impedance to determine fractures. U.S. Pat. No. 2,244,484, (Beers) measures downhole impedance (impedance log) to locate fractures by determining propagation velocity. U.S. Pat. No. 3,344,881, (White) uses three coordinate oriented transducers for directional detection of propagating seismic energy. These three patents merely illustrate the state of the art.

U.S. Pat. No. 4,870,627, "Method and Apparatus for Detecting and Evaluating Borehole Wall Fractures" (Hsu et al.), relates to a method and apparatus for generating a quick look display of an acoustic investigation of a borehole wherein a parameter of interest is derived from vertically spaced sonic receivers and displayed in a laterally continuous display log where the parameter values from respective receivers are recorded at preassigned positions. A fracture sensitive parameter is measured such as the energy in a low frequency Stoneley wave and when the parameter values are laterally recorded areas indicative of fractures become visually enhanced particularly with a laterally expanded display log. Techniques for the detection and evaluation of fractures are described.

U.S. Pat. No. 4,885,723, "Acoustic Apparatus and Method for Detecting Borehole Wall Discontinuities Such as Vertical Fractures" (Havira et al.), relates to an apparatus and methods described for detecting fractures in a wall of a borehole penetrating an earth formation. An acoustic transducer produces pulses of acoustic energy at beam forming frequencies with the direction of the beam being so oriented as to preferentially excite transverse waves in the wall of the borehole. Discontinuities such as fractures cause a reflection of the transverse waves and these in turn are detected so that a positive identification of fractures is obtained. Fractures having various inclination angles are detected by employing apparatus and methods for scanning the acoustic beam while maintaining its orientation which preferentially enhances transverse waves. In this manner the transverse waves may be directed perpendicular to the fractures to enhance detectable reflections. A transducer employing an array of individually excitable acoustic elements is described with associated controls.

U.S. Pat. No. 4,020,451, "Methods and Apparatus for Recording Well Logging Measurements" (Elliott) relates to a system whereby distinctive indicia having a "three-dimensional" appearance and representative of well logging data is produced by a CRT (Cathode-ray tube) recorder by modulating both the intensity and position of the sweeping electron beam in response to variations in the data. Distinctive indicia in the form of a vector or arrow representative of the data is also produced by sweeping the CRT electron beam in such a way that it defines an increasing spiral pattern. The electron beam is then turned on for a short pulse at the same angular position of each cycle of the spiral. For purposes of synchronization, in each of the above embodiments the beam sweep is initiated by a recurring event, such as a pulse indicative of a given incremental change in the depth level from which the data was derived. In still another embodiment, one of the above techniques is combined with presently available techniques to produce a combination log having the distinctive indicia recorded on one portion of the CRT screen and regular traces recorded on another portion of the same screen. Yet in another embodiment, alternating sweeps of the CRT electron beam are switched between two recording areas or strips on the CRT screen. A different recording medium is located adjacent each of the two recording strips thereby allowing the generation of two separate recordings. The data recorded on each medium may be completely different, or the data may be the same but recorded with different scale factors.

U.S. Pat. No. 4,870,627, (Hsu et al.) and 4,885,723, (Havira et al.) are both examples of fracture determination by measuring the amplitude of reflected sonic or acoustic waves. In U.S. Pat. No. 4,020,451, (Elliott) reflected wave amplitudes are used to control the electron beam of a CRT in recording downhole information. All three of these relate to the measurement of fractures by using reflected compressional waves.

U.S. Pat. No. 3,688,619, "Three-Dimensional Presentation of Borehole Logging Data" (Dennis) describes a technique and system for recording, on a two dimensional recording medium, data obtained from cyclic scanning operations carried out angularly around the wall of the borehole at each of a plurality of different depths wherein subsurface parameters are sensed during each scanning operation. In one embodiment, a plurality of loop shaped trace patterns, preferably in elliptical form, are recorded in the form of a helix to form a representation of the borehole wall. Different sides of the helix may be intensified or half sections of the helix recorded to illustrate different sections of the borehole wall.

SUMMARY OF THE INVENTION

The present invention provides a method and apparatus by which fractured rock formations are identified and their orientation may be determined. Two orthogonal motion sensors are used in conjunction with a downhole orbital vibrator which includes a device for orienting the sensors. The output of the sensors is displayed as a Lissajou figure. The shape of the figure changes when a subsurface fracture is encountered in the borehole. The present invention provides a tool that identifies fractured rock formations and enables the azimuthal orientation of the fractures to be determined.

DESCRIPTION OF THE PREFERRED EMBODIMENT

Figure 1:
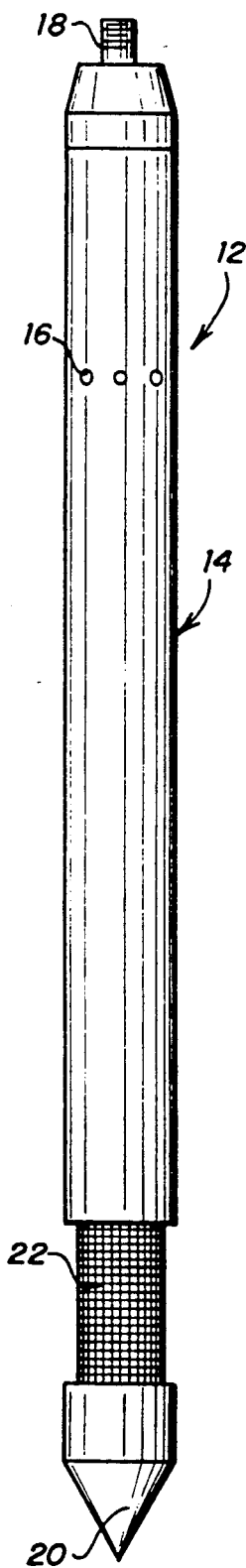
FIG. 1 is a plan view of a downhole tool which contains sensors that may be used to practice the method of the present invention.

Referring now to FIG. 1, a cross sectional view of a downhole logging tool 12 is illustrated. Logging tool 12 comprises a steel tube 14, having air relief holes 16 with provision for connection to a standard logging head 18. The bottom portion of logging tool 12 is arranged in a conical shape to permit easy descent down a well bore with a minimum of interference from the well bore sides. Directly above conical portion 20 is a wire screen section 22 which is set in from the edges of steel tube 14 to avoid mud packing.

Figure 2:
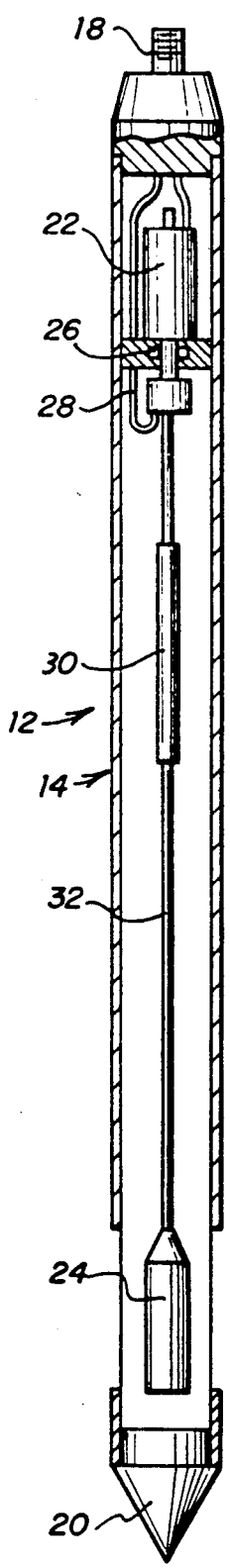
FIG. 2 is a sectional view of the downhole tool illustrated in FIG. 1.

FIG. 2 shows a cross sectional view of the logging tool of FIG. 1. Within steel tube 14 is a motor 22 which is used to rotate downhole orbital source 24 for different azimuth readings. Isolating motor 22 is O-Ring seal 26 which prevents contamination of the motor environment from the drilling mud. Flexible wire bundle 28 is illustrated as connected to orientation device 30. Orientation device 30 may be anything that is commonly used in the art, such as a gyro, a compass, etc. Orientation device 30 detects the orientation of orbital source 24 which is used in the calculation of the orientation of any detected fractures. Orientation device 30 is connected to downhole orbital source 24 through flexible hose 32.

In operation, after the tool is lowered to a desired depth, the orientation of two orthogonal geophones located in orbital source 24 are determined by orientation device 30. Source 24 is turned on and the phase angle between the two geophones is determined. At the same depth, the orbital source is continually or incrementally rotated using motor 22, measuring both the phase angle and the orientation or azimuth. A plot of the phase vs. the azimuth is determined for a given depth. This plot is used to determine the presence of fracturing, its magnitude and the fracture orientation.

Figure 3A:
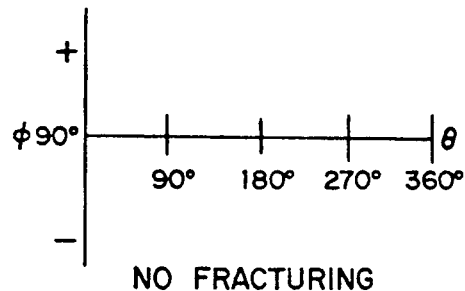
FIGS. 3-A through 3-C are graphical representations of phase angle vs. azimuth as viewed on an oscilloscope screen.
Figure 3B:
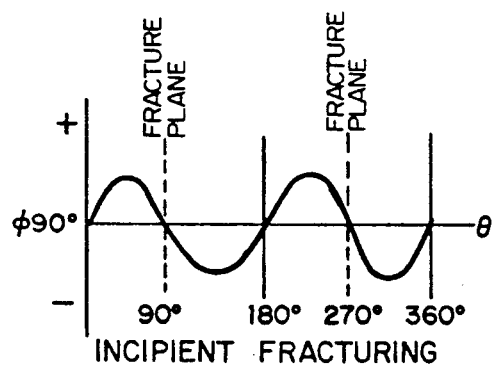
Figure 3C:
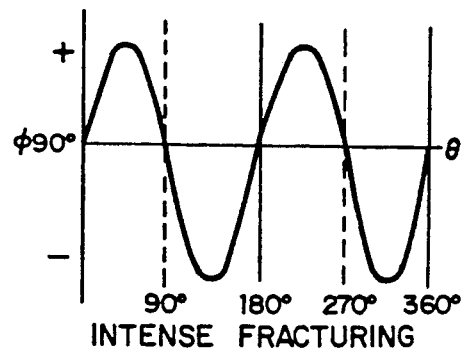

FIGS. 3-A through 3-C indicate plot, phase angle vs. azimuth. As indicated in FIG. 3-A, where no fracturing is present, there is no plot of phase angle vs. azimuth. In FIG. 3-B, where there is incipient fracturing, the phase angle vs. azimuth plot results in a sine function which indicates the fracture planes In FIG. 3-C intense fracturing results in the phase angle vs. azimuth plot in which the peaks of the sine curve are of a high value. Thus, the apparatus of the present invention clearly indicates the presence of fractures, their magnitude, and their orientation.

Figure 4:
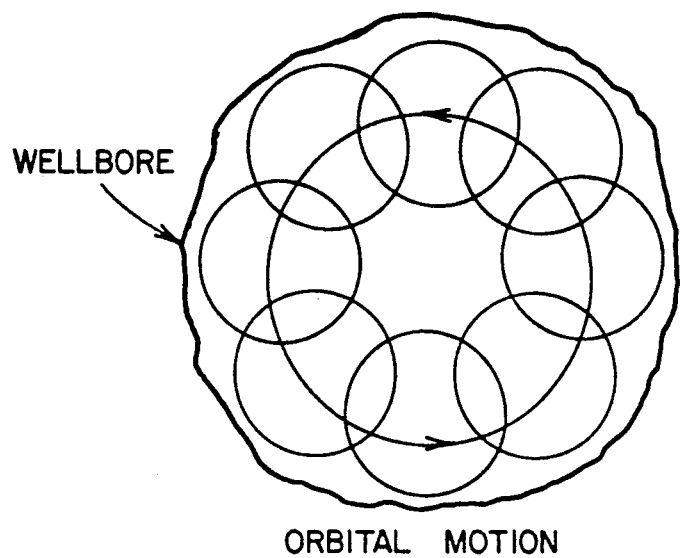
FIG. 4 is a Lissajou figure of orbital motion when no fractures are present.
Figure 5:
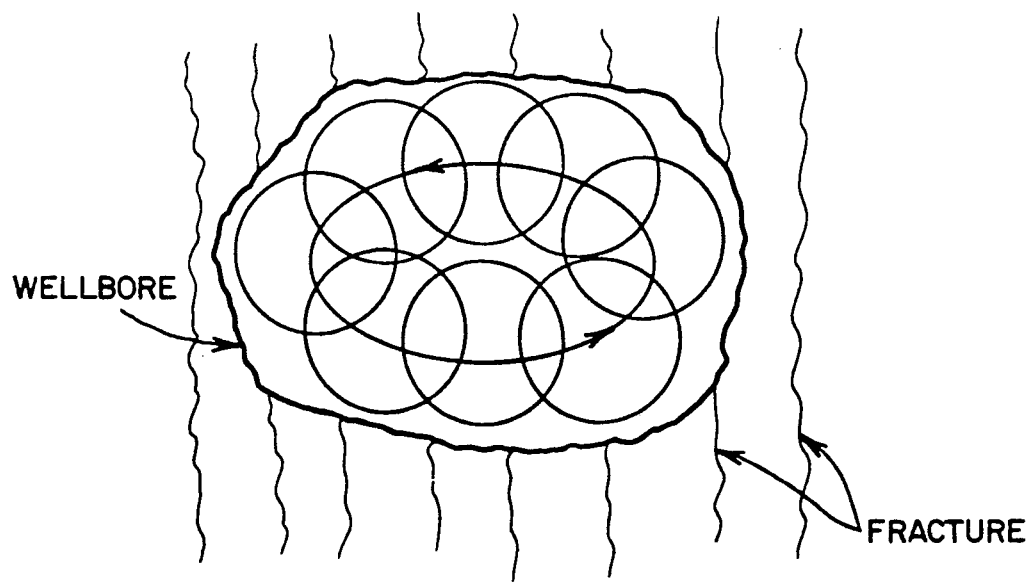
FIG. 5 is a Lissajou figure of orbital motion in a fractured environment.

FIG. 4 illustrates the orbital motion of orbital source 24 in a bore hole where no fractures are present and where the orbital motion is circular in manner. FIG. 5 illustrates the orbital motion of orbital source 24 in the presence of a fracture. As can be seen, the motion is an ellipse. This ellipse will rotate in response to rotation of a vibrator when viewed as a Lissajou figure.

Figure 6:
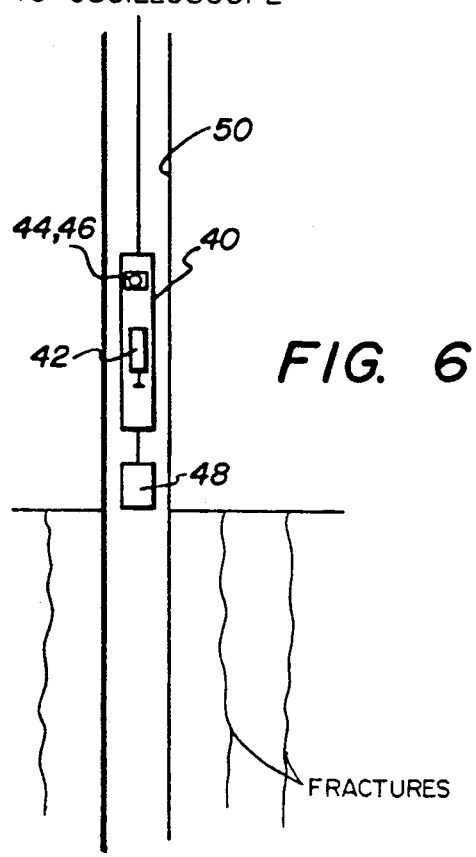
FIG. 6 is a plan view of the orientation of a downhole tool in a non-fractured formation.
Figure 7:
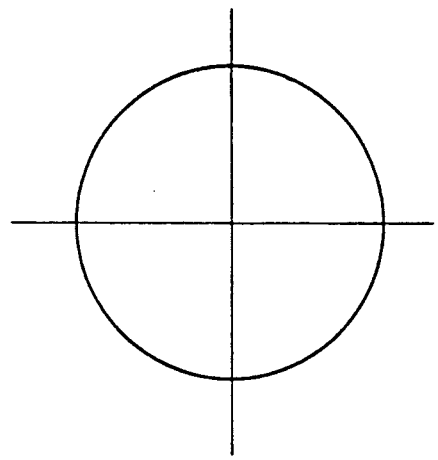
FIG. 7 is a Lissajou figure of sensor outputs in the nonfractured formation of FIG. 6 as viewed on an oscilloscope screen.

FIG. 6 illustrates the operation of an alternate embodiment of the present invention. A down hole tool 40 is illustrated as having a horizontal vibrator 42 equipped with two orthogonal motion sensors 44 and 46. Attached to orbital down hole tool 40 is a device 48 to determine sensor orientation. Device 48 may be a compass, gyroscope, etc. or any other device commonly used in the art. Down hole orbital tool 40 is illustrated as being placed in bore hole 50. In FIG. 6, it is clearly indicated that down hole orbital tool 40 is located in a portion of the bore hole 50 where there are no fractures present. FIG. 7 is an illustration of the Lissajou figure for orthogonal sensors in this non-fractured formation.

Figure 8:
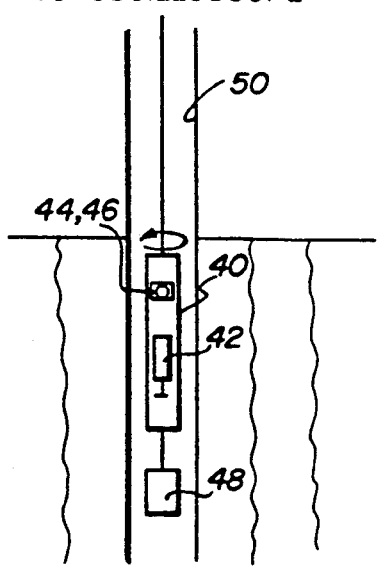
FIG. 8 is a plan view of the orientation of a downhole tool in a vertically fractured or near vertically fractured formation.
Figure 9:
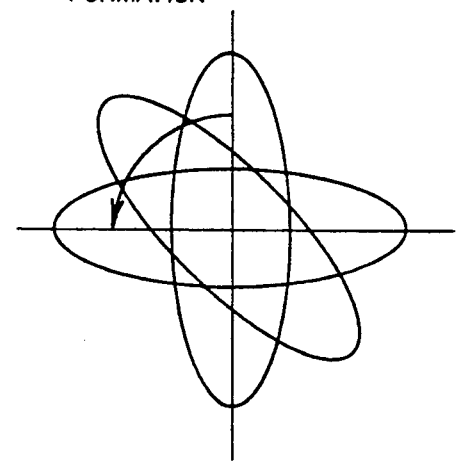
FIG. 9 is a Lissajou figure of sensor outputs in the vertically or near vertically fractured formation of FIG. 8 as viewed on an oscilloscope screen.

FIG. 8 illustrates down hole orbital tool being lowered in bore hole 50 to a position where fractures are present. FIG. 9 illustrates the Lissajou figure for orthogonal sensors when the formation is fractured.

This invention utilizes a downhole orbital vibrator equipped with two orthogonal motion sensors and a device, such as a downhole compass, for orienting the sensors. To observe a lissajou figure, the orthogonal motion sensors, such as geophones, are connected to the x and y inputs of a device for displaying waveforms, such as an oscilloscope. One geophone is connected to the x input and another to the y input. A lissajou figure is produced on the oscilloscope when the tool vibrates. The shape of the lissajou figure is monitored as the tool is raised in the bore hole. In a non-fractured formation, the two motion sensors will display a ninety degree phase difference and the vibrator will vibrate in a circular or orbital manner. When the sensor outputs are displayed as a lissajou figure (independent x,y inputs), the figure is circular (see FIG. 4). When the tool vibrates in a formation containing vertical, or near vertical, fractures the motion of the tool becomes elliptical with the axes of the elliptical motion sensors oriented parallel and perpendicular to the formation fractures. The lissajou figure formed by this motion is an ellipse (see FIG. 5). The eccentricity of the ellipse increases with increasing fracture density. This ellipse will rotate in response to rotation of a vibrator. When the Lissajou figure indicates a ninety degree phase difference between sensors, the sensors are aligned parallel and perpendicular to the formation fractures. When a fractured formation is located based upon the shape of the lissajou figure, the tool is held at a constant depth and the vibrator is rotated. Rotation of the vibrator produces rotation of the lissajou figure. The orientation of the fractures is determined by aligning the major axis of the ellipse along one of the inputs. The fracture direction is then oriented along the minor axis direction of the ellipse. This tool should permit rapid identification of fractured formations and allow the orientation of the fractures to be determined.

Logging tool 12 is designed to locate and orient vertical fractures in the subsurface. After lowering the tool to a desired depth, the orientation of the two orthogonal geophones in the orbital source are determined Next, source 24 is turned on and the phase angle ($\Phi$) between the two motion sensors is determined. In the preferred embodiment, motion sensors 44 and 46 are geophones. While at the same depth, the orbital source is continually or incrementally rotated, measuring both the phase angle ($\Phi$) and the orientation or azimuth ($\Theta$)/ A plot of $\Phi$ versus $\Theta$ is determined for a given depth. This plot is used to determine the presence of fracturing, its magnitude and the fracture orientation (see FIGS. 3A-3C).

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for locating subsurface fractures comprising the steps of:
    lowering an orbital vibrator equipped with two orthogonal motion sensors and an orientation detector downhole;
    rotating the orbital vibrator in an orbital manner;
    receiving outputs from each of said orthogonal motion sensors;
    displaying outputs of said orthogonal sensors as a lissajou figure; and
    identifying a subsurface fracture whenever said display defines an ellipse.

2. The method according to claim 1 also including the steps of:

determining the phase difference between said orthogonal motion sensors; and identifying the orientation of a fracture when said elliptical display indicates a ninety degree phase difference between sensors.

3. An apparatus for determining subsurface formation fractures comprising:
external housing;
orbital source means for providing orbital rotational motion;
two orthogonal motion sensors configured at a ninety degree phase difference for detecting motion fixed to said orbital source;
motor means for rotating said orbital source;
orientation device connected to said orbital source for determining the orientation of said motor sensors; and
device for displaying waveforms connected to said orthogonal motion sensors for displaying outputs of said orthogonal motion sensors as a lissajou figure.

4. The apparatus according to claim 3, wherein said orthogonal motion sensors are geophones.

5. The apparatus according to claim 3, wherein said orthogonal motion sensors are accelerometers.

6. The apparatus according to claim 3, wherein said orientation device is a gyroscope.

7. The apparatus according to claim 3, wherein said orientation device is a compass.

8. The apparatus according to claim 3, wherein said motor is a fluid driven motor.

9. The apparatus according to claim 3, wherein said motor is an electrically operated motor.

10. An apparatus for determining subsurface formation fractures comprising:
an external housing;
orbital source means for providing orbital rotational motion;
two orthogonally configured geophones fixed to said orbital source configured at a ninety degree phase difference for detecting motion;
fluid motor for rotating said orbital source;
gyroscope connected to said orbital source for determining the orientation of said motor sensors; and
device for displaying waveforms connected to said orthogonally configured geophones for displaying outputs of said orthogonally configured geophones as a lissajou figure.

* * * * *